United States Patent [19]
Schade et al.

[11] 3,778,042
[45] Dec. 11, 1973

[54] HUMIDIFIER FOR ENVIRONMENTAL CONTROL SYSTEM

[75] Inventors: John Alan Schade; Hans Levy, both of Cherry Hill, N.J.

[73] Assignee: A.C. Manufacturing Company, Cherry Hill, N.J.

[22] Filed: May 18, 1972

[21] Appl. No.: 254,449

Related U.S. Application Data

[63] Continuation-in-part of Ser. No. 69,790, Aug. 4, 1970.

[52] U.S. Cl. ......... 261/105, 261/106, 261/DIG. 41, 261/DIG. 34, 55/491
[51] Int. Cl. ............................................... B01f 3/04
[58] Field of Search ................. 261/106, DIG. 41, 261/105, DIG. 34; 55/491

[56] References Cited
UNITED STATES PATENTS

| | | | |
|---|---|---|---|
| 2,604,311 | 7/1952 | Summerhill | 55/491 |
| 1,874,734 | 8/1932 | Bacon | 55/491 |
| 3,322,405 | 5/1967 | Knudson et al. | 261/106 |
| 2,637,540 | 5/1953 | Rowe | 261/DIG. 41 |
| 2,356,757 | 8/1944 | Fleisher | 261/106 |
| 3,193,259 | 7/1965 | Libemann | 261/DIG. 15 |
| 3,075,750 | 1/1963 | Goettl | 261/106 |
| 2,992,701 | 7/1961 | White | 55/491 |
| 2,537,217 | 1/1951 | Farr | 55/491 |

*Primary Examiner*—Tim R. Miles
*Attorney*—Robert K. Youtie

[57] ABSTRACT

An upstanding open support in an airway, an upper liquid feeder and a lower liquid collector, a pervious sheet extending across the support between the feeder and the collector for transmitting liquid therebetween while presenting the liquid to passing air, and means to insure free liquid flow to and through the pervious sheet.

9 Claims, 3 Drawing Figures

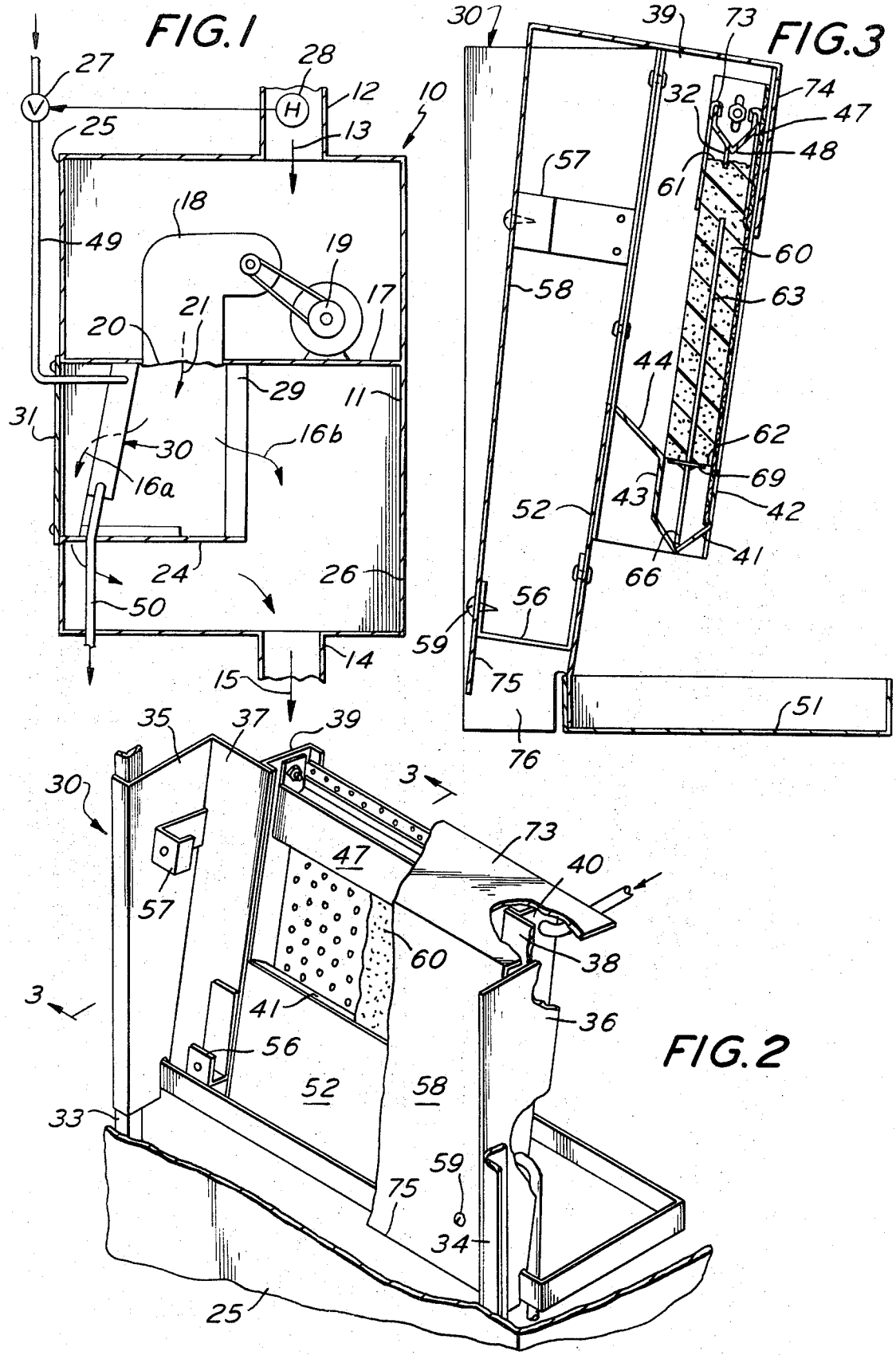

3,778,042

HUMIDIFIER FOR ENVIRONMENTAL CONTROL SYSTEM

CROSS-REFERENCES TO RELATED APPLICATIONS

This application is a Continuation-in-Part of our copending prior application Ser. No. 69,790 filed Aug. 4, 1970 entitlted HUMIDIFIER FOR ENVIRONMENTAL CONTROL SYSTEM, now abandoned.

BACKGROUND OF THE INVENTION

In air conditioning and similar environmental control systems, the provisions for humidifying air have always been troublesome, involving excessive space for sufficient air-liquid contact, requiring frequent maintenance for removal of corrosion, scale, algae, and the like, utilization of substantial manpower and time in replacing filter elements, and otherwise preserving against the effects of pollution, corrosion and dirt, and in insuring an adequate supply of liquid to the air under widely varying conditions of operation without dispensing excessive amounts of liquid.

SUMMARY OF THE INVENTION

It is, therefore, an important object of the present invention to provide a humidifying and filtering system for use in environmental control apparatus which overcomes the above-mentioned difficulties, utilizes only a minimum of space while affording ample area of surface contact between passing air and liquid, is simple and economic in structure for manufacture and sale at a reasonable cost, being capable of quick and easy removal and replacement of filter elements and effective cleaning to remove corrosion, scale, algae and the like, with substantial savings in labor of maintenance as well as materials.

It is still another object of the present invention to provide a humidifying device of the type described which is simple and durable for a long useful life, and includes a readily removable filter element which may be discarded or cleaned and reused, as desired.

It is still a further object of the present invention to provide a humidifying device having the advantageous characteristics mentioned in the preceding paragraphs, wherein unique structural combinations coact to minimize liquid or droplet carryover from the humidifier, while effectively insuring that adequate liquid is continuously presented to the moving air without an excessive amount of liquid passing to the humidifier.

Other objects of the present invention will become apprent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a diagrammatic sectional elevational view illustrating an environmental control system of the present invention incorporating the instant humidifying device in an air stream.

FIG. 2 is a top perspective view showing the humidifying device of the present invention apart from the system, and partly broken away to illustrate features of construction.

FIG. 3 is a sectional elevational view taken generally along the line 3—3 of FIG. 2.

DESCRIPTION OF THE PREFERRED EMBODIMENT

Referring now more particularly to the drawings, and specifically to FIG. 1 thereof, an environmental control system is there generally designated 10, and may include a cabinet, housing or casing 11, which for purposes of illustration and without limiting intent, may have an upper end opening or duct 12 providing an air inlet, as in the direction of arrow 13, and a lower end opening or outlet duct 14 providing an air outlet, as in the direction of arrow 15. As will appear more fully hereinafter, the air stream branches or bifurcates into two paths, as indicated by arrows 16a and 16b, which paths recombine for exit from the cabinet 11.

Interiorly of the cabinet may be a generally horizontal upper partition or wall 17 carrying air moving apparatus, such as a blower 18 driven by suitable motive means 19 and arranged to move air through an opening 20 in the partition 17 in the downward direction of arrow 21.

A horizontal support or shelf 24 is fixed in the cabinet 11, spaced between the partition 17 and lower cabinet wall, also being spaced from the opposite cabinet side walls 25 and 26 to define through the cabinet the branch air streams or paths 16a and 16b. The branch air streams or paths 16a and 16b extend in general parallelism with each other, both communicating between the blower outlet or partition opening 20 and the cabinet outlet or opening 14, the path 16a extending leftward about the shelf 24 between the latter and cabinet side wall 25, and the path 28 extending rightward of the shelf 24 between the shelf and the cabinet side wall 26. A cooling coil 29 may be mounted on the shelf 24 interposed in the air stream or path 16b, on the right side of the blower outlet 20, as seen in FIG. 1. Additionally, a humidifier device constructed in accordance with the teachings of the present invention, generally designated 30, may be mounted on the shelf 24 interposed in and extending across the path of air or branch stream 16a, on the leftward side of the blower outlet opening 20, as seen in FIG. 1, Thus, the branch air stream or path 16b passes through cooling coil 29, and the branch air stream or path 16a passes through the humidifier 30, which branches recombine at arrow 15 for egress through the outlet opening 14.

The humidifier device 30 is disposed just inward of and in facing relation with a removable wall panel or closure 31 in the cabinet wall 25. That is, by any conventional releasable fastener means, the panel 31 is selectively removable to afford quick, convenient and easy access to the humidifier device.

The humidifying device 30 is seen in greater detail in FIGS. 2 and 3. It will there be seen that the humidifying device is mounted between a pair of laterally spaced, upright cabinet frame member, as at 33 and 34 in FIG. 2. A pair of laterally spaced angle members 35 and 36 extend obliquely upwardly, being respectively fixed by suitable securing means to frame members 33 and 34. The angle members 35 and 36 extend in facing parallelism with each other obliquely upwardly and inwardly away from the adjacent cabinet wall 25, and have generally coplanar flanges 37 and 38 extending laterally toward and spaced from each other, the spacing therebetween being aligned with and facing toward the wall opening closed by cover panel 31.

Extending along and fixedly secured to the coplanar flanges 37 and 38, on the inner or interior surfaces thereof, are respective channels 39 and 40 which extend in facing spaced parallelism with each other. In a lower region of the space between facing channels 39 and 40, there is disposed an upwardly facing collector or trough 41 which extends horizontally between and has its opposite ends suitably fixed to respective channels 39 and 40. As best seen in FIG. 3, the trough or collector 41 may have a lower generally V-shaped cross-section, an inner wall 42 adjacent to the inner flanges of channels 39 and 40, an outer wall 43 provided with a forwardly and upwardly inclined lip 44 terminating proximate to the outer flanges of the channels 39 and 40.

In spaced relation over the collection member or trough 41 is a generally horizontally disposed feeder or trough 47. The upper trough or feeder 47 is located adjacent to the inner or upstream flanges of channels 39 and 40, so as to be located upstream of and above the lower trough 41, by reason of the upstream inclination of the channels. Extending between upper regions of the channels 39 and 40 and being suitably fixed thereto, the feeder trough 47 is provided with a plurality of downwardly opening apertures or feed holes 48, see FIG. 3. Thus, the horizontally extending collector trough 41 and feeder trough 47 are spaced vertically from each other, and suitable feed conduit means 49 is connected to the feeder trough while suitable drain conduit means 50 is connected to the collector trough. The feed conduit 49 is connected to a source of liquid or water, and interposed in the conduit is a constant flow regulator or valve 27 of the type assuring a constant liquid flow throughout a wide range of liquid pressure variation. The valve means 27 is operated by an operator 28 which includes a humidistat or other humidity sensing means so as to operate the valve 27 in response to humidity changes.

Beneath the lower and upper trough 41 and 47 there may be provided a drain pan 51, say fixed to the lower ends of flanges 37 and 38, and which may communicate with outlet conduit 50, for correcting and disposing of spilled liquid, and the like. A closure member or plate 52 may extend laterally between lower regions of flanges 37 and 38, suitably fixed thereto, and generally vertically between the pan 51 and upper edge of collection trough extension or lip 44. Further, depending from the underside of the upper dispensing trough or feeder 47, and particularly from the lower region of the V-shaped section, is a spacer member or strip 32, which extends laterally between the channels 39 and 40, projecting beneath the feeder trough adjacent to,- but without obstructing the feeder holes 48.

Extending in upright relation, inclined in the upstream direction of air flow, between the facing channels 39 and 40, is an open support 53, such as a reticulate sheet or perforate plate. The openwork support 53 may rest in the trough or collector 41, extending obliquely upwardly and inwardly therefrom in the upstream direction with its opposite side edge margins resting on the inner flanges of channels 39 and 40, and terminating proximate to the upper feeder or trough 47. See FIG. 3. The support member or plate may be fixed in position as described above, or removably supported, the latter permitting of easier cleaning and replacement.

Suitable cover mounting means are provided, as by a pair of lower brackets 56 projecting outwardly from the lower region of respective flanges 37 and 38, and upper brackets 57 projecting outwardly from upper regions of the members 35 and 36. A cover member or sheet 58 is disposed in facing relation with the reticulate support plate 53, spaced on the downstream side thereof and extending entirely across between the angle members 35 and 36. The cover member 58 is secured in position against the brackets 56 and 57, as by screw fasteners 59 extending through the cover threadedly into brackets 56, or other suitable securing means. Further, the cover 58 includes a top wall 73 extending upstream over the space between facing channels 39 and 40, and further includes a closure member or depending extension 74 depending to a level below the top of upper trough or feeder 47. By this means, the upper trough or feeder 47 is excluded from direct communication with the upstream side of the humidifier, to prevent the carryover of liquid by air directly from the feeder trough into the air stream. Further, the lower, downstream edge 75 of the closure 58 is located adjacent to but spaced from the plate 52, as by a space or opening 76, so as to constrict and effectively minimize the passage of air through the reticulate support 53 to a desired degree.

Removably supported by the reticulate support member or plate 53 is a generally rectangular sheet 60 of porous or pervious material, such as a filter element of plastic foam, or the like. The porous sheet or filter element 60 may be of a configuration to substantially completely cover the openwork or perforate support plate 53, having its upper edge 61 disposed immediately beneath, spaced from and facing upwardly toward the underside of the feeder trough 47 for receiving liquid from the feeder through the holes 48. Further, the spacer strip or flange 32 is engageable with the upper edge 61 of filter element 60 to maintain the latter spaced from the feeder holes 48, and thereby prevent capillary withdrawal of liquid from the feeder. The liquid received at the upper edge 61 of the filter 60 passes downwardly through the open cell material of the filter, and the lower filter edge 62 is disposed within or directly over and in downwardly facing relation with respect to the upwardly opening collector trough 41 for gravitationally discharging liquid to the collector trough.

In order to maintain the filter 60 in its upright position as illustrated, and to resist buckling and sagging especially under the weight of contained liquid and the air stream force, it has been found advantageous to provide a plurality of relatively stiff, elongate reinforcing members or rods 63 extending in substantial parallelism and generally upright within the material of the filter. The reinforcing members or rods 63 are disposed to lie in vertical planes, as seen in FIG. 3, and extend obliquely upwardly in the plane of the filter 60. Further, the lower ends of the reinforcing members or rods 63 depend beneath and beyond the lower edge 62 of the filter element to define feet, as at 66 for supporting end engagement with the nether surface of the collector 41. The reinforcing members or rods 63 are provided, preferably immediately beneath the lower filter edge 62, with transverse projection, say in the form of collars, as at 69, fixed relative to the rods for supporting the filter element in spaced relation over the lower rod extremities 66. In this manner, the filter element is maintained in spaced relation over the lower region of the collector 41, so as not to impeded or impair collection and drainage flow of liquid by the collector.

It will now be appreciated that the filter element 60 is effectively maintained in the proper position, as illustrated, throughout long periods of use, notwithstanding the forces imparted by contained liquid and filtered material, while permitting of quick and easy removal and replacement, as by mere downward depression of the upper filter edge 61, and removal of the filter element and contained reinforcing members 63 for replacement by a reverse procedure. It will further be appreciated that by the inclined upstream relation of the filter medium 60, the air forces tending to effect liquid carryover from the filter medium are resisted by the gravitational forces so that for this reason liquid carryover is further minimized. The cover member or sheet 58, in addition to its total flow limiting feature, serves to prevent liquid carryover, by reason of requiring a relatively sharp turn in the path of the medium, whereupon droplets would be centrifugally removed.

From the foregoing, it will now be appreciated that the instant invention provides a filtering and humidifying apparatus for an environmental control system which is extremely simple in structure, entirely reliable in operation, highly effective to produce substantial economies in maintenance, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. In an environmental control system the combination comprising air passage means, an upstanding support arranged across said passage means and having a central reticulate formation affording communication through said support, a liquid collection trough extending along a lower region of said central formation, a liquid feeder extending along an upper region of said central formation, a pervious sheet extending across said central formation between said feeder and trough for receiving liquid from the former and gravitationally passing liquid to the latter while presenting the liquid to passing air, a plurality of relatively stiff elongate generally upstanding reinforcing members extending within said pervious sheet to resist deformation of the latter, said reinforcing members depending from the lower edge of said pervious sheet into said trough to maintain said sheet with its lower edge in direct downwardly facing spaced relation with said trough to prevent obstruction of the latter by said sheet, and spacer means depending from said feeder into limiting engagement with said pervious sheet to space the latter from said feeder and thereby prevent capillary action by the sheet with the liquid in the feeder.

2. The combination according to claim 1, in combination with transverse projections on said reinforcing members for retaining engagement with the lower edge of said porous sheet to positively retain the latter in its spaced relation over said trough without appreciably obstructing the lower edge of said pervious sheet to gravitational liquid flow therethrough or obstructing said trough to liquid flow therealong.

3. The combination according to claim 1, in combination with valve means connected in fluid communication with said feeder, and valve operator means connected to said valve means and responsive to humidity of the controlled space.

4. The combination according to claim 3, said valve means comprising constant flow regulator means, to assure constant flow within a wide range of pressure variations.

5. The combination according to claim 1, said feeder comprising a dispensing trough having bottom feed holes, said spacer means projecting from the underside of said dispensing trough to maintain said sheet spaced from said feed holes.

6. The combination according to claim 1, said reticulate formation comprising a reticulate wall on the upstream side of said sheet to reduce air flow without reducing liquid area exposed to air flow, for effective vaporization without water carryover.

7. The combination according to claim 1, said upstanding support and reticulate formation being inclined toward the upstream side, whereby the force of gravity on liquid opposes the force of air flow to minimize liquid carryover.

8. The combination according to claim 1, in combination with a cover on the downstream side of said upstanding support to limit flow of combined air and vapor.

9. The combination according to claim 8, said feeder comprising a dispensing trough having bottom feed holes, said spacer means projecting from the underside of said dispensing trough to maintain said sheet spaced from said feed holes, and a closure over said dispensing trough to exclude air flow therefrom and minimize liquid carryover.

* * * * *